(12) United States Patent
Araki et al.

(10) Patent No.: US 7,912,558 B2
(45) Date of Patent: Mar. 22, 2011

(54) PLC FOR DISTRIBUTED CONTROL AND DISTRIBUTED CONTROL SYSTEM

(75) Inventors: Tsutomu Araki, Okazaki (JP); Sutemaro Kato, Kariya (JP); Friedrich Adams, Wettenberg (DE); Michael Niehaus, Florstadt (DE)

(73) Assignee: JTEKT Corporation, Osaka-shi (JP)

( * ) Notice: Subject to any disclaimer, the term of this patent is extended or adjusted under 35 U.S.C. 154(b) by 170 days.

(21) Appl. No.: 11/494,540

(22) Filed: Jul. 28, 2006

(65) Prior Publication Data

US 2007/0055388 A1     Mar. 8, 2007

(30) Foreign Application Priority Data

Aug. 2, 2005   (JP) ................................. 2005-223887

(51) Int. Cl.
   *G05B 19/18*   (2006.01)
(52) U.S. Cl. .................. 700/5; 700/18; 700/21; 700/87
(58) Field of Classification Search .................... 700/18, 700/21, 5, 86–87
   See application file for complete search history.

(56) References Cited

U.S. PATENT DOCUMENTS

| | | | | |
|---|---|---|---|---|
| 4,897,777 A | * | 1/1990 | Janke et al. ........................ | 700/5 |
| 5,815,659 A | * | 9/1998 | Umetsu et al. ................. | 709/203 |
| 2005/0017875 A1 | * | 1/2005 | Nakayama et al. ...... | 340/870.07 |
| 2005/0033457 A1 | * | 2/2005 | Yamane ........................... | 700/18 |
| 2005/0060606 A1 | * | 3/2005 | Kalan et al. ..................... | 714/12 |
| 2005/0085928 A1 | * | 4/2005 | Shani ............................. | 700/18 |

FOREIGN PATENT DOCUMENTS

| | | |
|---|---|---|
| EP | 2 317461 A | 3/1998 |
| EP | 1 231 526 A1 | 8/2002 |
| JP | 03-127104 | 5/1991 |
| JP | 06-085793 | 3/1994 |
| JP | 6-266646 | 9/1994 |
| JP | 10-91221 | 4/1998 |
| JP | 2000-250612 | 9/2000 |
| JP | 2001-216020 | 8/2001 |
| JP | 2002-358106 | 12/2002 |
| JP | 2003-233404 | 8/2003 |
| JP | 2003-263202 | 9/2003 |
| JP | 2005-129026 | 5/2005 |

OTHER PUBLICATIONS

U.S. Appl. No. 12/519,881, filed Jun. 18, 2009, Araki.

* cited by examiner

*Primary Examiner* — Paul L Rodriguez
*Assistant Examiner* — Nathan Laughlin
(74) *Attorney, Agent, or Firm* — Oblon, Spivak, McClelland, Maier & Neustadt, L.L.P.

(57) ABSTRACT

A PLC for distributed control includes a storage unit that stores common-data specifying information for specifying common data shared by a corresponding PLC and another PLC, a receiving unit that receives the common-data specifying information from another PLC, and a collating unit that collates the common-data specifying information stored in the storage unit with the common-data specifying information received by the receiving unit.

22 Claims, 5 Drawing Sheets

EXCHANGE NUMBER '00'

EXCHANGE NUMBER '01'

EXCHANGE NUMBER '02'

FIG. 4A1

| U | N | U | U | ... | N |
|---|---|---|---|---|---|
| L00 | L01 | L42 | L43 | ... | L7F |

EXCHANGE NUMBER '00'

FIG. 4A2

| N | ... | U | U | ... | U | N |
|---|---|---|---|---|---|---|
| L00 | ... | L04 | L44 | L45 | ... | L7F |

EXCHANGE NUMBER '00'

FIG. 4B

| U | N | U | U | ... | N |
|---|---|---|---|---|---|
| L00 | L01 | L42 | L43 | ... | L7F |

EXCHANGE NUMBER '01'

FIG. 4C

| N | ... | U | U | ... | U | N |
|---|---|---|---|---|---|---|
| L00 | ... | L04 | L44 | L45 | ... | L7F |

EXCHANGE NUMBER '02'

US 7,912,558 B2

PLC FOR DISTRIBUTED CONTROL AND DISTRIBUTED CONTROL SYSTEM

BACKGROUND OF THE INVENTION

The present invention relates to a PLC (programmable controller) for distributed control and a distributed control system including a plurality of PLCs for distributed control connected to one another.

Recently, in order to control mechanical equipments positioned at a plurality of places for factory automation, a distributed control system including a plurality of PLCs controlling mechanical equipments connected to one another has been known (for example, see Patent Document 1).

Such a distributed control system according to the related art uses a method in which adjacent PLCs are connected to each other by a plurality of I/O wiring lines and a plurality of signals are transmitted through the I/O wiring lines. Since safety PLCs for securing the safety of control objects are required to correctly transmit a plurality of control signals, such as interlock signals, according to a plurality of control objects to one another, the above-mentioned method is very effective.

Patent Document 1: JP-A-2002-358106

However, in the above-mentioned method, an operator is required to manually check the connection between the PLC terminals connected to the individual I/O wiring lines in order to determine whether communication by each wiring line is correctly performed, resulting in a low maintenance property. Further, since the plurality of I/O wiring lines should be provided between the PLCs, the number of PLCs increases, and thus the cost increases.

SUMMARY OF THE INVENTION

An object of the invention is to provide a PLC for distributed control that improves the maintenance property while securing the safety of the communication with another PLC constituting a distributed control system.

Another object of the invention is to provide a distributed control system that improves the maintenance property while securing the safety of the communication between PLCs for distributed control.

According to a first aspect of the invention, a PLC for distributed control that constitutes a distributed control system together with another PLC includes: a storage unit that stores common-data specifying information for specifying common data shared by a corresponding PLC and another PLC; a receiving unit that receives the common-data specifying information from another PLC; and a collating unit that collates the common-data specifying information stored in the storage unit with the common-data specifying information received by the receiving unit. In the PLC for distributed control, it is possible to automatically, not manually, determine whether the common data is correctly transmitted between the corresponding PLC for distributed control and another PLC. Therefore, it is possible to secure the safety of communication between the PLC for distributed control and another PLC and to improve a maintenance property.

In the PLC for distributed control according to a first aspect, the collating unit may perform the collation of the common-data specifying information when the distributed control system starts or restarts. Therefore, it is possible to secure the safety of the communication between the PLC for distributed control and another PLC whenever the distributed control system starts or restarts.

Further, in the PLC for distributed control according to the first aspect, the common-data specifying information may include information on an address where the common data is assigned in a frame used for communication of the distributed control system. For this reason, even though a plurality of common data are assigned to a plurality of addresses of one frame and are simultaneously transmitted thereto, it is possible to secure the safety of the transmission on the basis of the above-mentioned theory. Therefore, it is possible to improve the maintenance property and to reduce the cost by reducing the number of signal lines while securing the safety of the communication between the PLC for distributed control and another PLC.

Furthermore, the PLC for distributed control according to the first aspect may constitute the distributed control system together with a plurality of PLCs. In this case, the common-data specifying information may include identification information for identifying the plurality of PLCs. With this construction, it is possible to determine which of the plurality of PLCs the common-data specifying information is received from. Therefore, the PLC for distributed control can accurately perform the collation for the common-data specifying information received from other PLCs by using the collating unit.

According to a second aspect of the invention, a distributed control system includes a plurality of PLCs for distributed control according to the first aspect connected to one another. In the distributed control system, the plurality of PLCs for distributed control are mutually cooperated with one another. Therefore, it is possible to secure the safety of the communication among the PLCs for distributed control and to remarkably improve the maintenance property of the overall distributed control system.

In the distributed control system according to the second aspect, each of the PLCs for distributed control may be a safety PLC for ensuring the safety of a control object connected to the corresponding PLC for distributed control. Since the safety of the communication among the PLCs for distributed control is secured as described above, it is possible to correctly transmit the common data related to the safety of the control objects among the PLCs for distributed control. Therefore, it is possible to secure the safety of all the control objects connected to each of the PLCs for distributed control with high reliability.

Further, in the distributed control system according to the second aspect, the common-data specifying information may be input to each of the PLCs for distributed control together with a program to be executed by the corresponding PLC for distributed control. With this construction, the sequence program to be executed by each of the PLCs for distributed control and the common-data specifying information can be freely changed in response to the requirement of the system specification, thereby expanding the versatility of the distributed control system.

Furthermore, in the distributed control system according to the second aspect, the common-data specifying information may be associated with each other and may be output on a ladder diagram representing the content of programs to be executed by the PLCs for distributed control. With this construction, an operator of the distributed control system can check the common-data specifying information among the PLCs for distributed control together with the ladder diagram with eyes, thereby further improving the maintenance property.

BRIEF DESCRIPTION OF THE DRAWINGS

FIG. 4A1 to 4C are schematic diagrams illustrating the operation of the distributed control system according to the second embodiment.

DETAILED DESCRIPTION OF PREFERRED EMBODIMENTS

Hereinafter, a plurality of embodiments of the invention will be described with reference to the accompanying drawings.

First Embodiment

Figure 2:
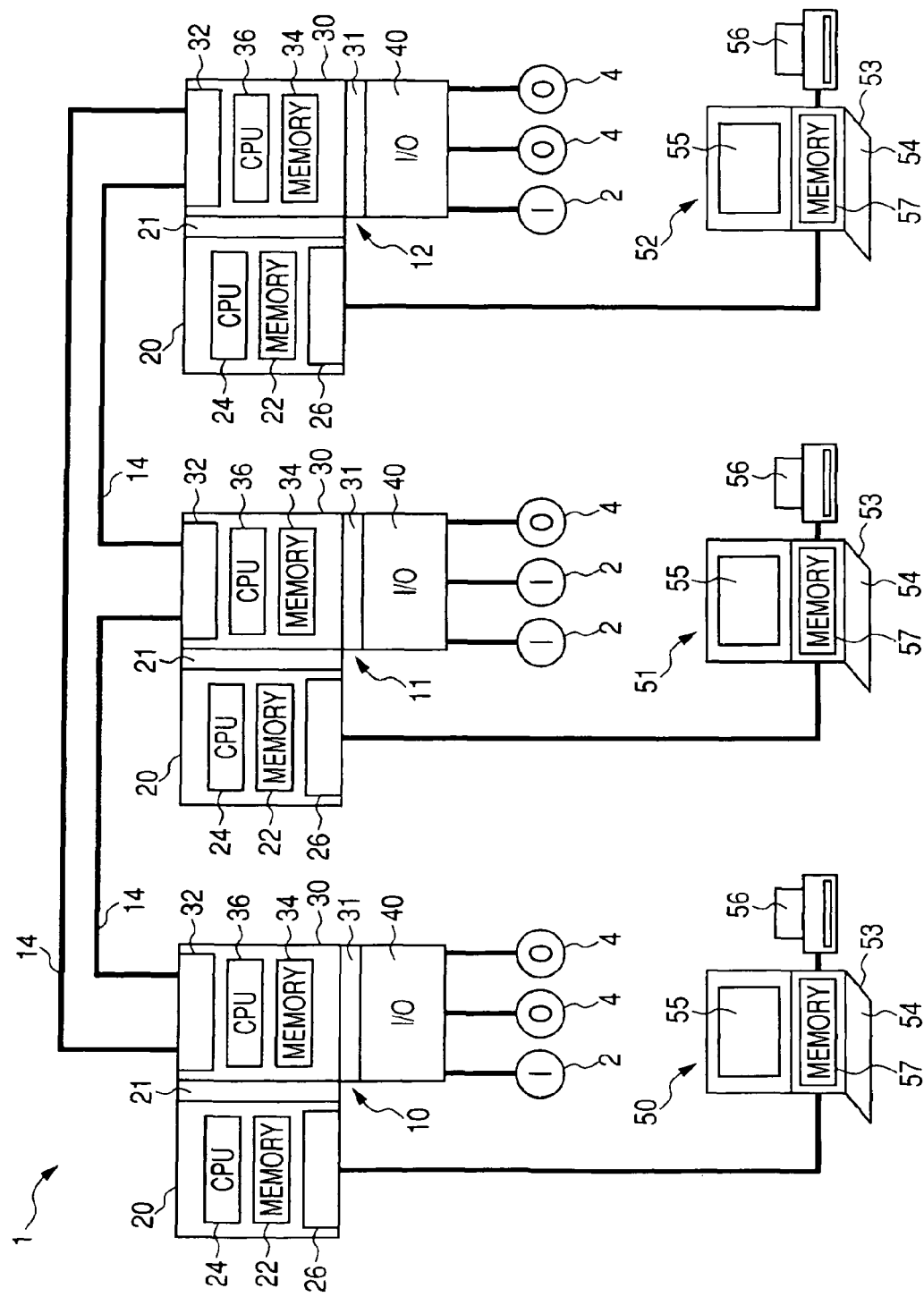
FIG. 2 is a block diagram showing a distributed control system according to the first embodiment and a second embodiment.

FIG. 2 shows a distributed control system according to a first embodiment of the invention. A distributed control system 1 is a network system including a plurality of safety PLCs connected in a ring topology. The distributed control system 1 performs distributed control on a plurality of output devices 4 on the basis of input information from a plurality of input devices 2 so as to secure the safety of the output devices 4.

In the distributed control system 1, the maximum number of safety PLCs capable of being connected to the distributed control system 1 is set to 24. In this embodiment, three safety PLCs 10, 11, and 12 are connected to the distributed control system 1. Each of a plurality of signal lines 14 connecting the safety PLCs 10, 11, and 12 is an optical fiber line or a conductive line. Communication among the safety PLCs 10, 11, and 12 through the signal lines 14 uses frames each of which is composed of a bit string with a predetermined bit length. Here, a bit address is assigned as address information to bit data constituting one frame by the operation of a communication module 30 to be described below. In this embodiment, frame data is received and transmitted between two of the safety PLCs 10, 11, and 12. In other words, the distributed control system 1 according to the first embodiment is a broadcast network system.

Each of the safety PLCs 10, 11, and 12 constituting the distributed control system 1 has a CPU module 20, a communication module 30, and an I/O module 40.

The CPU module 20 includes a microcomputer as the main constituent and is connected to the communication module 30 through a bus 21. A memory 22 of the CPU module 20 stores a sequence program written in a ladder diagram language. The CPU module 20 controls reception and transmission of control instructions or data through the bus 21 by allowing a CPU 24 to execute the sequence program. Further, in this embodiment, the CPU module 20 of the safety PLC 10 instructs the communication module 30 of the safety PLC 10 to output a control instruction for controlling communication between the safety PLCs 11 and 12, thereby controlling the communication of the whole system.

The communication module 30 includes a microcomputer as the main constituent. The communication module 30 is connected to the CPU module 20 through the bus 21, and is also connected to the I/O module 40 through a bus 31. The communication module 30 has an interface 32 connected to the signal lines 14 between the communication module 30 and the other PLCs. A memory 34 of the communication module 30 stores a communication program. The communication module 30 executes the communication program by a CPU 36 so as to control reception and transmission of data or control instructions through the buses 21 and 22 and the interface 32 according to a control instruction received from the CPU module 20.

The I/O module 40 is connected to an emergency button, a predetermined number of input devices 2 such as safety sensors, a motor, and a predetermined number of output devices 4 such as robots. The I/O module 40 transmits data indicating the state of the input devices 2 to the communication module 30. Further, the I/O module 40 performs, for example, power supply control on the output devices 4 according to the control instruction received from the communication module 30.

In the distributed control system 1 according to the first embodiment, I/O devices 50, 51, and 52 are connected to interfaces 26 provided in the CPU modules 20 of the safety PLCs 10, 11, and 12, respectively. Each of the I/O devices 50, 51, and 52 has a computer 53, an input device 54, a monitor 55, and a printer 56.

An operator inputs, to a computer, exchange numbers of safety PLCs connected to the corresponding computer 53 by operating the input device 54 such as a keyboard or a mouse. Here, the exchange numbers are identification information for identifying the safety PLCs 10, 11, and 12, and exchange numbers '00', '01', and '02' are set to the safety PLCs 10, 11, and 12 in this embodiment, respectively.

Further, the operator inputs, to the computer 53, a sequence program to be executed by the CPU module 20 of the safety PLC connected to the corresponding computer 53. Here, the sequence program is a program according to a ladder diagram describing a data reception/transmission sequence by the PLC connected to the computer 53, for example, a program according to one of FIGS. 3A to 3C corresponding to the exchange number of the PLC connected to the computer 53.

Figure 3A:
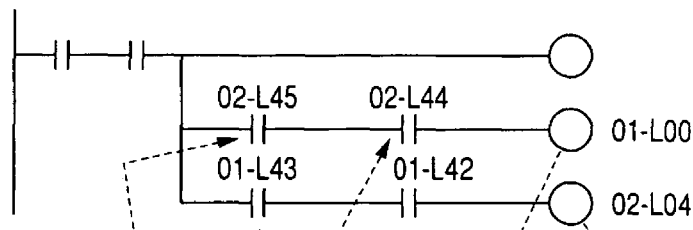
FIGS. 3A to 3C are schematic diagrams illustrating the operation of the distributed control systems according to the first and second embodiments.
Figure 3B:
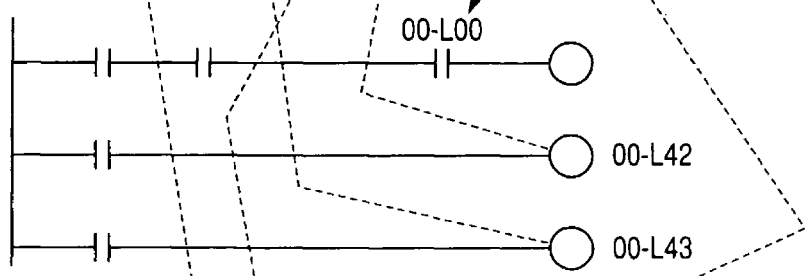
Figure 3C:
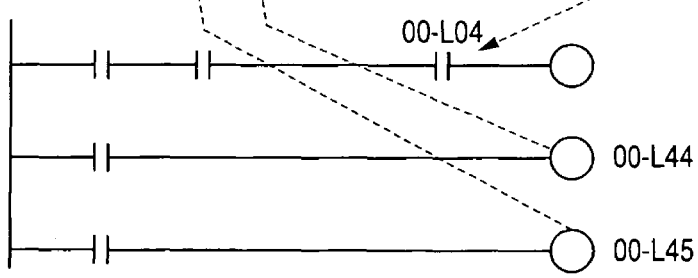

In the ladder diagrams shown in FIGS. 3A to 3C, a parameter 'd-a' associated with a coil represents an exchange number 'd' (one of 00 to 02) of the destination PLC of the transmission data and a bit address 'a' (one of L00 to L7F) of the transmission data in the frame. Further, in the ladder diagrams shown in FIGS. 3A to 3C, a parameter 'D-A' associated with a contact point represents an exchange number 'D' (one of 00 to 02) of the destination PLC of the reception data and a bit address 'A' (one of L00 to L7F) of the reception data in the frame. Therefore, the parameters 'd-a' and 'D-A' can be considered as common-data specifying information for specifying data to be shared by the safety PLCs 10, 11, and 12. In this embodiment, the operator inputs the common-data specifying information together with the sequence program to the computer 53 by operating the input device 54.

The exchange number, the sequence program, and the common-data specifying information (the parameters 'd-a' and 'D-A') input to the computer 53 as described above are stored in a memory 57 of the computer 53. Then, the exchange number, the sequence program, and the common-data specifying information are input from the computer 53 to the CPU module 20 of the safety PLC connected to the corresponding computer in response to the operator's instruction and are then stored in the memory 22. The common-data specifying information stored in the memory 22 of the CPU module 20 is transferred to the memory 34 of the communication module 30 through the bus 21 in an initial operation to be described below. Further, in the initial operation, the parameter 'd-a' of the transferred information related to the transmission data to be transmitted to another safety PLC is output by the communication module 30 and is transmitted to a safety PLC with the exchange number corresponding to the value 'd' of the parameter 'd-a'.

An input operation by the computer 53 and the input device 54 is performed as described above. Now, an output operation of the computer 53 to the monitor 55 and the printer 56 will be described. First, in response to an operator's instruction, the computer 53 reads the sequence program and the common-data specifying information stored in the memory 57. Then, the computer 53 associates the common-data specifying information with each other on a ladder diagram representing the content of the sequence program, as shown in FIGS. 3A to 3C, and then outputs the common-data specifying information from at least one of the monitor 55 and the printer 56. Here, output from the monitor 55 means displaying, on the monitor 55, the ladder diagram in which the common-data specifying information are associated with each other. Further, output from the printer 56 means printing the ladder diagram in which the common-data specifying information is associated with each other on a medium such as a sheet.

Next, an initial operation that is performed by the distributed control system 1 immediately after starting or immediately after restarting will be described. In this embodiment, the distributed control system 1 starts by turning on a main power supply of the corresponding system. Furthermore, the distributed control system 1 restarts by resetting the main power supply of the corresponding system.

Figure 1:
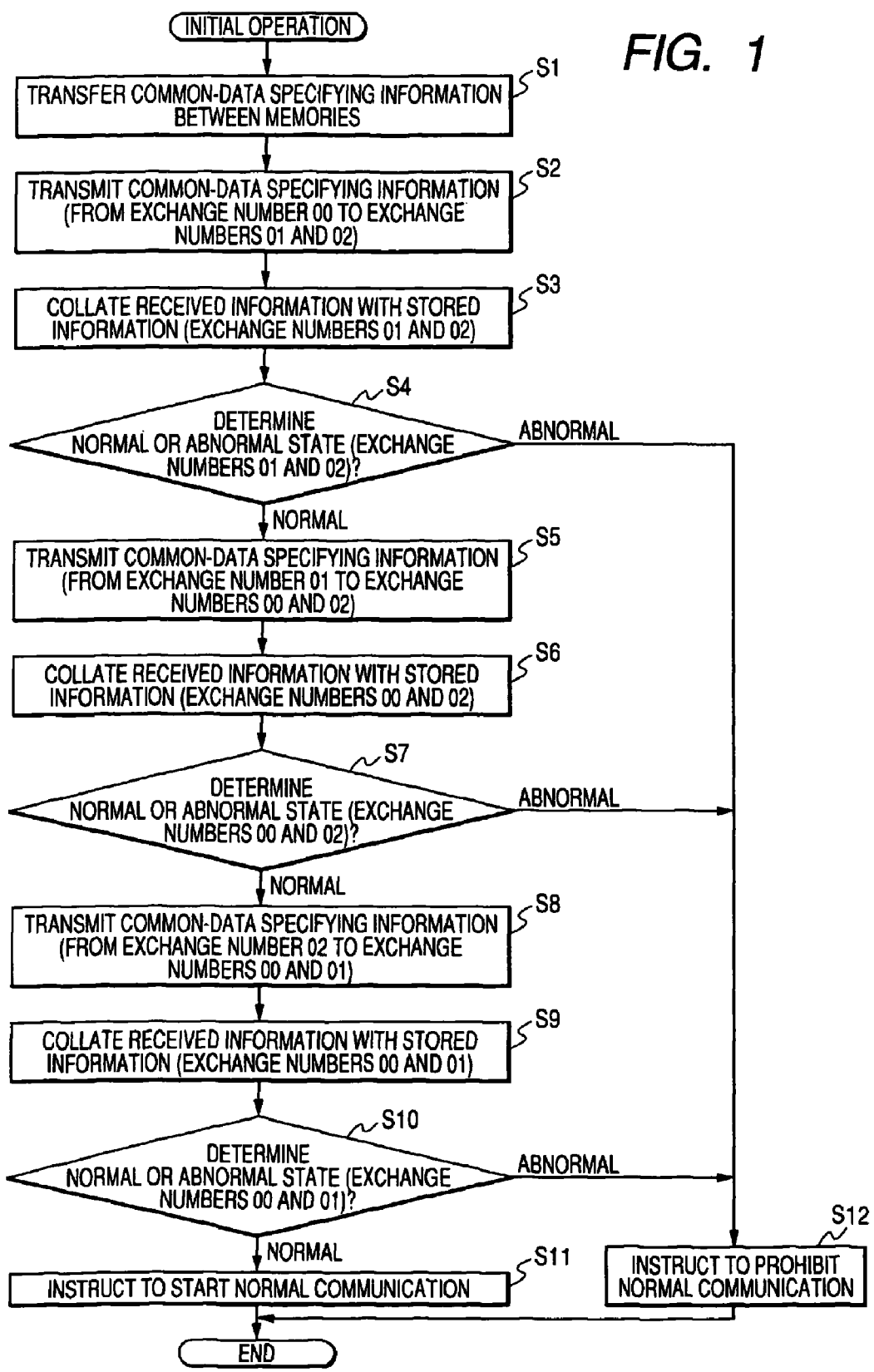
FIG. 1 is a flow chart illustrating an initial operation according to a first embodiment of the invention.

As shown in FIG. 1, when the initial operation starts, each of the safety PLCs, 10, 11, and 12 transfers the common-data specifying information from the memory 22 of the CPU module 20 to the memory 34 of the communication module 30 (Step S1). Subsequently, the communication module 30 of the safety PLC 10 reads the common-data specifying information related to data shared by the safety PLCs 11 and 12 from the memory 34, and transmits the read common-data specifying information to the safety PLCs 11 and 12 (Step S2). The common-data specifying information transmitted from the safety PLC 10 to the safety PLC 11 is a parameter '01-a' related to data transmitted from the safety PLC 10 to the safety PLC 11, for example, a parameter '01-L00' shown in FIG. 3A. Further, the common-data specifying information transmitted from the safety PLC 10 to the safety PLC 12 is a parameter '02-a' related to data transmitted from the safety PLC 10 to the safety PLC 12, for example, a parameter '02-L04' shown in FIG. 3A.

After receiving the common-data specifying information from the safety PLC 10, the communication module 30 of each of the safety PLCs 11 and 12 collates the received common-data specifying information with the common-data specifying information stored in the memory 34 of the corresponding communication module (Step S3). More specifically, the communication module 30 of the safety PLC 11 checks whether the 'a' value of the parameter '01-a' of the reception information from the safety PLC 10 corresponds to the 'A' value of the parameter '00-A' related to data received from the safety PLC 10 of the information stored in the memory 34. For example, when the parameter '01-L00' shown in FIG. 3A is received and the parameter '00-L00' shown in FIG. 3B is stored in the memory 34 of the safety PLC 11, the communication module 30 of the safety PLC 11 determines that the parameters correspond to each other. In the safety PLC 12, the communication module 30 checks whether the 'a' value of the parameter '02-a' of the reception information from the safety PLC 10 corresponds to the 'A' value of the parameter '00-A' related to data received from the safety PLC 10 of the information stored in the memory 34. For example, when the parameter '02-L04' shown in FIG. 3A is received and the parameter '00-L04' shown in FIG. 3B is stored in the memory 34 of the safety PLC 11, the communication module 30 of the safety PLC 12 determines that the parameters correspond to each other.

When determining that the reception information and the information stored in the memory 34 correspond to each other in Step S3, the communication module 30 of each of the safety PLCs 11 and 12 determines that a normal state in which data is correctly transmitted between the safety PLC 10 and the corresponding safety PLC has been confirmed (Step S4). On the other hand, when determining that the reception information and the information stored in the memory 34 does not correspond to each other, the communication module 30 of each of the safety PLCs 11 and 12 determines that an abnormal state in which data cannot be correctly transmitted between the safety PLC 10 and the corresponding safety PLC has been confirmed (Step S4).

After both the safety PLCs 11 and 12 confirm the normal state in Step S4, the communication module 30 of the safety PLC 11 reads the common-data specifying information related to data shared by the safety PLCs 11 and 12 from the memory 34, and transmits the read common-data specifying information to the safety PLCs 10 and 12 (Step S5). Here, the common-data specifying information transmitted from the safety PLC 11 to the safety PLC 10 is a parameter '00-a' related to data to be transmitted from the safety PLC 11 to the safety PLC 10, for example, parameters '00-L42' and '00-L43' shown in FIG. 3B. Also, the common-data specifying information transmitted from the safety PLC 11 to the safety PLC 12 is a parameter '02-a' related to data to be transmitted from the safety PLC 11 to the safety PLC 12.

When having received the common-data specifying information from the safety PLC 11, the communication module 30 of each of the safety PLCs 10 and 12 collates the received information with the common-data specifying information stored in the memory 34 of the corresponding module (Step S6). More specifically, the communication module 30 of the safety PLC 10 checks whether the 'a' value of the parameter '00-a' of the information received from the safety PLC 11 corresponds to the 'A' value of the parameter '01-A' related to data received from the safety PLC 11 of the information stored in the memory 34. For example, when the parameter '00-L42' shown in FIG. 3B is received and the parameter '01-L42' shown in FIG. 3A is stored in the memory 34 of the safety PLC 10, or when the parameter '00-L43' shown in FIG. 3B is received and the parameter '01-L43' shown in FIG. 3A is stored in the memory 34 of the safety PLC 10, the communication module 30 of the safety PLC 10 determines that the parameters correspond to each other. In the safety PLC 12, the communication module 30 checks whether the 'a' value of the parameter '02-a' of the information received from the safety PLC 11 corresponds to the 'A' value of the parameter '01-A' related to data received from the safety PLC 11 of the information stored in the memory 34.

When determining that the received information and the information stored in the memory 34 correspond to each other in Step S6, the communication module 30 of each of the safety PLCs 10 and 12 determines that the normal state in which data is correctly transmitted between the safety PLC 11 and the corresponding safety PLC has been confirmed (Step S7). On the other hand, when determining that the received information and the information stored in the memory 34 does not correspond to each other, the communication module 30 of each of the safety PLCs 10 and 12 determines that the abnormal state in which data cannot be correctly transmitted between the safety PLC 11 and the corresponding safety PLC has been confirmed (Step S7).

After both the safety PLCs 10 and 12 confirm the normal state in Step S7, the communication module 30 of the safety PLC 12 reads the common-data specifying information related to data shared by the safety PLCs 10 and 11 from the memory 34, and transmits the read common-data specifying information to the safety PLCs 10 and 11 (Step S8). Here, the common-data specifying information transmitted from the safety PLC 12 to the safety PLC 10 is the parameter '00-a' related to data to be transmitted from the safety PLC 12 to the safety PLC 10, for example, parameters '00-L44' and '00-L45' shown in FIG. 3C. Also, the common-data specifying information transmitted from the safety PLC 12 to the safety PLC 11 is the parameter '01-a' related to data to be transmitted from the safety PLC 12 to the safety PLC 11.

The communication module 30 of each of the safety PLCs 10 and 11 having received the common-data specifying information from the safety PLC 12 collates the received information with the common-data specifying information stored in the memory 34 of the corresponding communication module (Step S9). More specifically, the communication module 30 of the safety PLC 10 checks whether the 'a' value of the parameter '00-a' of the information received from the safety PLC 12 corresponds to the 'A' value of the parameter '02-A' related to data received from the safety PLC 12 of the information stored in the memory 34. For example, when the parameter '00-L44' shown in FIG. 3C is received and the parameter '02-L44' shown in FIG. 3A is stored in the memory 34 of the safety PLC 10, or when the parameter '00-L45' shown in FIG. 3B is received and the parameter '02-L45' shown in FIG. 3A is stored in the memory 34 of the safety PLC 10, the communication module 30 of the safety PLC 10 determines that the parameters correspond to each other. In the safety PLC 11, the communication module 30 checks whether the 'a' value of the parameter '01-a' of the information received from the safety PLC 12 corresponds to the 'A' value of the parameter '02-A' related to data received from the safety PLC of the information stored in the memory 34.

When determining that the received information and the information stored in the memory 34 correspond to each other in Step S9, the communication module 30 of each of the safety PLCs 10 and 11 determines that the normal state in which data is correctly transmitted between the safety PLC 12 and the corresponding safety PLC has been confirmed (Step S10). On the other hand, when determining that the received information and the information stored in the memory 34 does not correspond to each other, the communication module 30 of each of the safety PLCs 10 and 11 determines that the abnormal state in which data cannot be correctly transmitted between the safety PLC 12 and the corresponding safety PLC has been confirmed (Step S10).

After both the safety PLCs 10 and 11 confirm the normal state in Step S10, that is, when all of the safety PLCs 10, 11, and 12 confirm the normal state, the communication module 30 of the safety PLC 10 instructs the CPU module 20 of the safety PLC 10 to start normal communication (Step S11). Meanwhile, when any one of the safety PLCs 10, 11, and 12 confirms the abnormal state, the communication module 30 of the safety PLC 10 instructs the CPU module 20 of the safety PLC 10 to prohibit the normal communication (Step S12).

According to the above-mentioned first embodiment, when the system starts or restarts, each of the safety PLC 10, 11, and 12 determines whether data is normally transmitted between the corresponding safety PLC and the other safety PLCs on the basis of the collation of its own the common-data specifying information with the common-data specifying information received from other PLCs. In other words, in the first embodiment, it is possible to automatically determine whether communication among the safety PLCs 10, 11, and 12 is correctly performed without the operator. Therefore, it is possible to ensure the safety of the communication among the safety PLCs 10, 11, and 12 and to improve the maintenance property of the overall system. In particular, since the safety of the communication among safety PLCs 10, 11, and 12 is secured, it is possible to ensure the safety of the output devices 4 connected to the safety PLCs 10, 11, and 12 with high reliability.

Further, according to the first embodiment, the parameters 'd-a' and 'D-A', which are the common-data specifying information, include the bit addresses 'a' and 'A' to which common data is assigned, in the frame used for the communication of the distributed control system. For this reason, even though a plurality of common data are assigned to a plurality of addresses of one frame and are simultaneously transmitted thereto, it is possible to secure the safety of the transmission on the basis of the above-mentioned theory. Therefore, it is possible to improve the maintenance property and to reduce the cost by reducing the number of signal lines while securing the safety of the communication among the safety PLCs 10, 11, and 12.

Furthermore, according to the first embodiment, the parameters 'd-a' and 'D-A', which are the common-data specifying information, include the exchange numbers 'd' and 'D' for identifying each of the safety PLCs 10, 11, and 12. The exchange numbers make it possible for the safety PLCs 10, 11, and 12 to determine which of the safety PLCs 10, 11, and 12 the received common-data specifying information is received from. Therefore, the safety PLCs 10, 11, and 12 can accurately perform the above-mentioned collation for common-data specifying information received from other PLCs.

In addition, according to the first embodiment, the sequence program to be executed by the safety PLCs 10, 11, and 112 and the common-data specifying information can be input to the safety PLCs 10, 11, and 12 through the I/O devices 50, 51, and 52. Therefore, the sequence program and the common-data specifying information can be freely changed in response to the requirement of the system specification, thereby expanding the versatility of the distributed control system 1.

Furthermore, according to the first embodiment, the I/O devices 50, 51, and 52 can output the common-data specifying information on the ladder diagram representing the content of the sequence program to be executed by the safety PLCs 10, 11, and 12, with the common-data specifying information associated with each other. Therefore, the operator can check from the output results of the I/O devices 50, 51, and 52 with eyes whether the common-data specifying information correctly specifies the common data to be transmitted among the safety PLCs 10, 11, and 12, as shown in the ladder diagram. As a result, it is expected to further improve the maintenance property.

The above-mentioned safety PLCs 10, 11, and 12 correspond to 'a PLC for distributed control' and 'other PLCs' described in the appended claims. Further, the memories 22 and 34 of each of the safety PLCs 10, 11, and 12 correspond to 'storage units' described in the appended claims. The communication module 30 of each of the safety PLCs 10, 11, and 12 correspond to 'a receiving unit', 'a collating unit', and a 'transmitting unit' described in the appended claims.

Second Embodiment

A second embodiment of the invention is a modification of the first embodiment. In the second embodiment, the same parts as those in the first embodiment are denoted by the same numerals, and thus a description thereof will be omitted.

A distributed control system 1 according to the second embodiment is a master-slave network system that has a safety PLC 10 serving as a master and safety PLCs 11 and 12 serving as slaves. Therefore, in the second embodiment, frame data is received and transmitted between the safety PLCs 10 and 11 and between the safety PLCs 10 and 12, while frame data is not received and transmitted between the safety PLCs 11 and 12.

In I/O devices 50, 51, and 52 of the second embodiment, common-data specifying information (parameters 'd-a' and 'D-A') input to a computer 53 is stored in a memory 57 of the computer 53, is processed into a frame format by the computer 53, and is stored in the memory 57.

More specifically, the computer 53 connected to the safety PLC 10 generates a frame in which data corresponding to bit addresses represented by the values 'a' and 'A' of the parameters '01-a' and '01-A' related to common data shared by the safety PLCs 10 and 11 are represented by 'use (U)' and data corresponding to the other bit addresses are represented by 'non-use (N)'. Therefore, the computer 53 connected to the safety PLC 10 generates a frame shown in FIG. 4A1 in which bit data having bit addresses 'L00', 'L42', and 'L43' corresponding to parameters '01-L00', '01-L42', and '01-L43' shown in FIG. 3A are 'U'. The computer 53 also generates a frame in which data corresponding to bit addresses represented by the values 'a' and 'A' of parameters '02-a' and '02-A' related to the common data shared by the safety PLCs 10 and 12 are 'U', and data corresponding to the other addresses are 'N'. Therefore, the computer 53 connected to the safety PLC 10 generates a frame shown in FIG. 4A2 in which bit data having, for example, bit addresses 'L04', 'L44', and 'L45' corresponding to parameters '02-L04', '02-L44', and '02-L45' shown in FIG. 3A are 'U'.

The computer 53 connected to the safety PLC 11 generates a frame in which data corresponding to bit addresses represented by the values 'A' and 'a' of the parameters '00-A' and '00-a' related to common data shared by the safety PLCs 10 and 11 are represented by 'use (U)' and data corresponding to the other bit addresses are represented by 'non-use (N)'. Therefore, the computer 53 connected to the safety PLC 11 generates a frame shown in FIG. 4B in which bit data having bit addresses 'L00', 'L42', and 'L43' corresponding to parameters '00-L00', '00-L42', and '00-L43' shown in FIG. 3B are 'U'.

The computer 53 connected to the safety PLC 12 generates a frame in which data corresponding to bit addresses represented by values 'A' and 'a' of parameters '00-A' and '00-a' related to the common data shared by the safety PLCs 10 and 12 are 'use (U)' and data corresponding to the other addresses are 'non-use (N)'. Therefore, the computer 53 connected to the safety PLC 12 generates a frame shown in FIG. 4C in which bit data having, for example, bit addresses 'L04', 'L44', and 'L45' corresponding to parameters '00-L04', '00-L44', and '00-L45' shown in FIG. 3C are 'U'.

The common-data specifying information processed into the frame format as described above is input from the computer 53 to the CPU module 20 of the safety PLC connected to the computer 53 together with the exchange numbers and the sequence program, and is stored in the memory 22 of the corresponding safety PLC. In an initial operation to be described below, the common-data specifying information stored in the memory 22 in the frame format is transferred to the memory 34 of the communication module 30 through the bus 21 and is then transmitted from the communication module 30 to another safety PLC.

Figure 5:
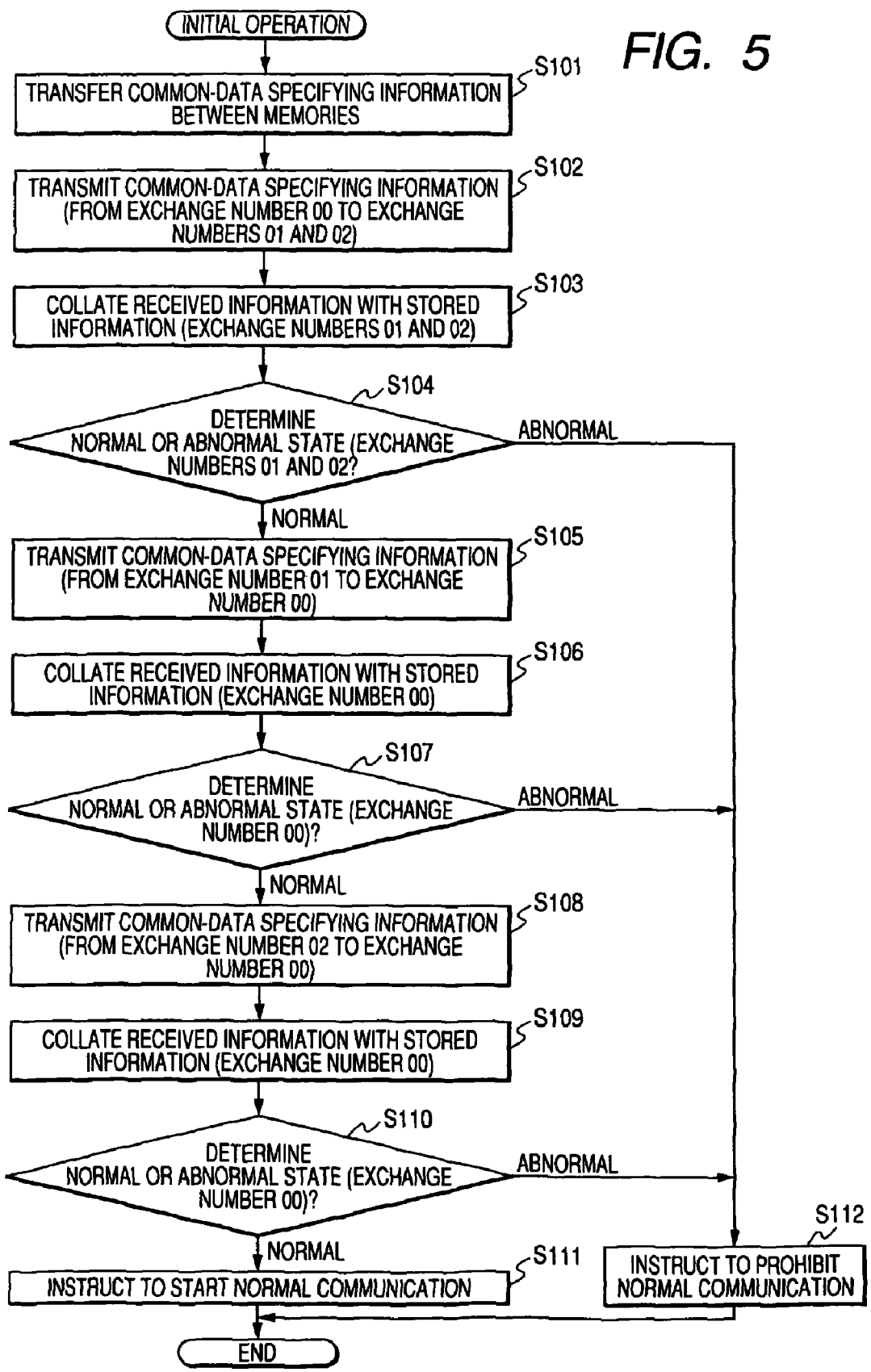
FIG. 5 is a flow chart illustrating an initial operation according to the second embodiment.

The initial operation according to the second embodiment is performed as shown in FIG. 5. That is, when the initial operation starts, each of the safety PLCs 10, 11, and 12 transfers the common-data specifying information of the frame format from the memory 22 of the CPU module 20 to the memory 34 of the communication module 30 (Step S101).

Subsequently, the communication module 30 of the safety PLC 10 reads, from the memory 34, a part of the common-data specifying information of the frame format that relates to the common data shared by the safety PLCs 10 and 11 and is shown in, for example, FIG. 4A1, and transmits the read information to the safety PLC 11 (Step 102). Then, the communication module 30 of the safety PLC 10 reads, from the memory 34, a part of the common-data specifying information of the frame format that relates to the common data shared by the safety PLCs 10 and 12 and is shown in, for example, FIG. 4A2, and transmits the read information to the safety PLC 12 (Step S102).

The communication module 30 of each of the safety PLCs 11 and 12 having received the common-data specifying information of the frame format from the safety PLC 10 collates the received common-data specifying information of the frame format with the common-data specifying information of the frame format stored in the memory 34 (Step S103). More specifically, the communication module 30 of the safety PLC 11 collates bit data of the frame received from the safety PLC 10 as the common-data specifying information with bit data of the frame stored in the memory 34 as the common-data specifying information so as to determine whether the bit data coincide with each other for each same address. For example, when a frame in which addresses where bit data are 'U' are 'L00', 'L42', and 'L43' as shown in FIG. 4A1 is received and a frame in which addresses where bit data are 'U' are 'L00', 'L42', and 'L43' as shown in FIG. 4B is stored, the communication module 30 of the safety PLC 11 determines that the bit data coincide with each other. Further, the communication module 30 of the safety PLC 12 collates bit data of the frame received from the safety PLC 10 as the common-data specifying information with bit data of the frame stored in the memory 34 as the common-data specifying information so as to determine whether the bit data coincide with each other for each same address. For example, when a frame in which addresses where bit data are 'U' are 'L04', 'L44', and 'L45' as shown in FIG. 4A2 is received and a frame in which addresses where bit data are 'U' are 'L04', 'L44', and 'L45' as shown in FIG. 4C is stored, the communication module 30 of the safety PLC 12 determines that the bit data coincide with each other.

On the basis of the collation results in Step S103, the communication modules 30 of the safety PLCs 11 and 12 perform determination, similar to Step S4 of the first embodiment (Step S104). When both the communication modules 30 of the safety PLCs 11 and 12 confirm the normal state in Step 104, the communication module 30 of the safety PLC 11 reads, from the memory 34, a part of the common-data specifying information of the frame format that relates to the common data shared by the safety PLCs 10 and 11 and is shown in, for example, FIG. 4B, and transmits the read information to the safety PLC 10 (Step S105).

The communication module 30 of the safety PLC 10 having received the frame format common-data specifying information from the safety PLC 11 collates the received frame format common-data specifying information with the frame format common-data specifying information stored in the memory 34 according to Step S103 (Step 106). On the basis of the collation result, the communication module 30 of the safety PLC 10 performs determination, similar to Step S7 of the first embodiment (Step S107).

When the communication module 30 of the safety PLC 10 confirms the normal state in Step S107, the communication module 30 of the safety PLC 12 reads, from the memory 34, a part of the frame format common-data specifying information that relates to the common data shared by the safety PLCs 10 and 12 and is shown in, for example, FIG. 4C, and transmits the read information to the safety PLC 10 (Step S108).

The communication module 30 of the safety PLC 10 having received the common-data specifying information of the frame format from the safety PLC 12 collates the received common-data specifying information of the frame format with the common-data specifying information of the frame format stored in the memory 34 according to Step S103 (Step S109). On the basis of the collation result, the communication module 30 of the safety PLC 10 performs determination based on Step S10 in the first embodiment (Step S110).

When the communication module 30 of the safety PLC 10 confirms the normal state in Step S110, it instructs the CPU module 20 of the safety PLC 10 to start normal communication, similar to Step S11 of the first embodiment (Step S111). Meanwhile, when any one of the safety PLCs 10, 11, and 12 confirms the abnormal state in Steps S104, S107, and S110, it instructs the CPU module 20 thereof to prohibit the normal communication based on Step S12 in the first embodiment (Step S112).

As described above, each of the safety PLCs 10, 11, and 12 according to the second embodiment can also determine the normal state or the abnormal state between the corresponding safety PLC and another safety PLC by collating the common-data specifying information stored in the corresponding safety PLC with the common-data specifying information received from another safety PLC. Therefore, the second embodiment can obtain the same effects as the first embodiment.

The embodiments of the invention have been described above, but the invention is not limited thereto.

For example, in the first embodiment, each of the safety PLCs 10, 11, and 12 may transmit the parameter 'D-A' related to the received data of the corresponding safety PLC to another safety PLC and may collate the parameter 'D-A' with the parameter 'd-a' stored in the corresponding safety PLC in relation to the transmitted data.

In the first and second embodiments, the invention is applied to the distributed control system 1 connected to a plurality of PLCs each securing the safety of a control object. However, the invention can be applied to a distributed control system connected to a plurality of PLCs each having a function other than the function of securing the safety of a control object. Further, a topology of a distributed control system to which the invention is applied may be a bus or star other than the ring described in the first and second embodiments, regardless of the type of PLC.

What is claimed is:

1. A PLC for distributed control in a distributed control system together with at least two other PLCs, wherein each of the PLCs is connected to all of the other PLCs to transmit data therebetween, the PLC comprising:
   a data transmission line connecting said PLC to all of the other PLCs in the distributed control system;
   a storage unit that stores common-data specifying information for specifying common data shared by respective programs executed by the PLC and the another PLC, wherein the common-data specifying information includes information on an address where the common-data is assigned in a frame of a ladder diagram representing the content of programs to be executed by the PLCs;
   a receiving unit that receives the common-data specifying information from the another PLC;
   a collating unit that collates the information on an address stored in the storage unit with the information on an address received by the receiving unit; and
   a normal data transmission determining unit that determines whether data is normally transmitted between the PLC for distributed control and the another PLC based on the collation of the common-data specifying information stored in the storage unit with the common-data specifying information received by the receiving unit.

2. The PLC according to claim 1, wherein the collating unit performs the collation of the common-data specifying information when the distributed control system starts or restarts.

3. The PLC according to claim 1, wherein the distributed control system is composed of a plurality of PLCs, and the common-data specifying information includes identification information for identifying the plurality of PLCs.

4. The PLC according to claim 1, further comprising means for prohibiting normal communication between the PLC for distributed control and the another PLC when it is determined that data transmission between the PLC and the another PLC is abnormal.

5. The PLC for distributed control according to claim 1, wherein the normal transmission determining unit determines that data is normally transmitted between the PLC for distributed control and the another PLC when the collation by the collating unit yields that the stored and received common-data specifying information corresponds to each other, and determines that data is abnormally transmitted between the PLC for distributed control and the another PLC when the collation by the collating unit yields that the stored and received common-data specifying information do not correspond to each other,
   further comprising a communication unit that starts normal communication in the distributed control system when the normal transmission determining unit determines that data is normally transmitted between the PLC for distributed control and the another PLC, and prohibits normal communication in the distributed control system when the normal transmission determining unit determines that data is abnormally transmitted between the PLC for distributed control and the another PLC.

6. A distributed control system comprising:
   at least three PLCs for distributed control, wherein each of the at least three PLCs is connected to all of the other PLCs of the distributed control system by signal lines and all of the PLCs are mutually cooperated with one another to transmit data therebetween by way of the signal lines, each of the PLCs comprising:
   a storage unit that stores common-data specifying information for specifying common data shared by respective programs executed by the respective PLC and another of the plurality of PLCs, wherein the common-data specifying information includes information on an address where the common-data is assigned in a frame of a ladder diagram representing the content of programs to be executed by the PLCs;
   a receiving unit that receives the common-data specifying information from another of the plurality of PLCs;
   a collating unit that collates the information on an address stored in the storage unit with the information on an address received by the receiving unit; and
   a normal data transmission determining unit that determines whether data is normally transmitted between the PLC and the another of the plurality of PLCs based on the collation of the common-data specifying information stored in the storage unit with the common-data specifying information received by the receiving unit.

7. The distributed control system according to claim 6, wherein each of the PLCs includes a transmitting unit that transmits the common-data specifying information to another of the plurality of PLCs.

8. The distributed control system according to claim 6, wherein each of the PLCs is a safety PLC for ensuring safety of a control object connected to the corresponding PLC.

9. The distributed control system according to claim 6, wherein the common-data specifying information is input to each of the PLCs together with a program to be executed by the corresponding PLC.

10. The distributed control system according to claim 6, further comprising means for prohibiting normal communication between each of the PLCs and the another of the plurality of PLCs when it is determined that data transmission between each of the PLCs and the another of the plurality of PLCs is abnormal.

11. The distributed control system according to claim 6, wherein the normal transmission determining unit determines that data is normally transmitted between the at least three PLCs when the collation by the collating unit yields that the stored and received common-data specifying information corresponds to each other, and determines that data is abnormally transmitted between the at least three PLCs when the collation by the collating unit yields that the stored and received common-data specifying information do not correspond to each other,
further comprising a communication unit that starts normal communication in the distributed control system when the normal transmission determining unit determines that data is normally transmitted between the at least three PLCs, and prohibits normal communication in the distributed control system when the normal transmission determining unit determines that data is abnormally transmitted between the at least three PLCs.

12. A PLC for distributed control in a distributed control system together with at least two other PLCs, wherein each of the PLCs is connected to all of the other PLCs to transmit data therebetween, the PLC comprising:
a data transmission line connecting said PLC to all of the other PLCs in the distributed control system;
storage means for storing common-data specifying information for specifying common data shared by respective programs executed by the PLC and the another PLC, wherein the common-data specifying information includes information on an address where the common-data is assigned in a frame of a ladder diagram representing the content of programs to be executed by the PLCs;
receiving means for receiving the common-data specifying information from another PLC;
collating means for collating the information on an address stored in the storage means with the information on an address received by the receiving means; and
normal data transmission determining means for determining whether data is normally transmitted between the PLC for distributed control and the another PLC based on the collation of the common-data specifying information stored in the storage means with the common-data specifying information received by the receiving means.

13. The PLC according to claim 12, wherein the collating means performs the collation of the common-data specifying information when the distributed control system starts or restarts.

14. The PLC according to claim 12, wherein the distributed control system is composed of a plurality of PLCs, and the common-data specifying information includes identification information for identifying the plurality of PLCs.

15. The PLC according to claim 12, further comprising means for prohibiting normal communication between the PLC for distributed control and the another PLC when it is determined that data transmission between the PLC and the another PLC is abnormal.

16. The PLC for distributed control according to claim 12, wherein the normal transmission determining means determines that data is normally transmitted between the PLC for distributed control and the another PLC when the collation by the collating means yields that the stored and received common-data specifying information corresponds to each other, and determines that data is abnormally transmitted between the PLC for distributed control and the another PLC when the collation by the collating means yields that the stored and received common-data specifying information do not correspond to each other,
further comprising communication means for starting normal communication in the distributed control system when the normal transmission determining means determines that data is normally transmitted between the PLC for distributed control and the another PLC, and prohibits normal communication in the distributed control system when the normal transmission determining means determines that data is abnormally transmitted between the PLC for distributed control and the another PLC.

17. A distributed control system comprising:
at least three PLCs for distributed control, wherein each of the at least three PLCs is connected to all of the other PLCs of the distributed control system by signal lines and all of the PLCs are all connected by signal lines and mutually cooperated with one another to transmit data therebetween by way of the signal lines, each of the PLCs comprising:
storage means for storing common-data specifying information for specifying common data shared by respective programs executed by the respective PLC and another PLC, wherein the common-data specifying information includes information on an address where the common-data is assigned in a frame of a ladder diagram representing the content of programs to be executed by the PLCs;
receiving means for receiving the common-data specifying information from another PLC;
collating means for collating the information on an address stored in the storage means with the information on an address received by the receiving means; and
normal data transmission determining means for determining whether data is normally transmitted between the PLC for distributed control and the another PLC based on the collation of the common-data specifying information stored in the storage means with the common-data specifying information received by the receiving means.

18. The distributed control system according to claim 17, wherein each of the PLCs includes a transmitting unit that transmits the common-data specifying information to another of the plurality of PLCs.

19. The distributed control system according to claim 17, wherein each of the PLCs is a safety PLC for ensuring safety of a control object connected to the corresponding PLC.

20. The distributed control system according to claim 17, wherein the common-data specifying information is input to each of the PLCs together with a program to be executed by the corresponding PLC.

21. The distributed control system according to claim 17, further comprising means for prohibiting normal communication between each of the PLCs and the another of the plurality of PLCs when it is determined that data transmission between each of the PLCs and the another of the plurality of PLCs is abnormal.

22. The distributed control system according to claim 17, wherein the normal transmission determining means determines that data is normally transmitted between the at least three PLCs when the collation by the collating means yields that the stored and received common-data specifying information corresponds to each other, and determines that data is abnormally transmitted between the at least three PLCs when the collation by the collating means yields that the stored and received common-data specifying information do not correspond to each other, further comprising communication means that starts normal communication in the distributed control system when the normal transmission determining means determines that data is normally transmitted between the at least three PLCs, and prohibits normal communication in the distributed control system when the normal transmission determining means determines that data is abnormally transmitted between the at least three PLCs.

* * * * *